May 2, 1961     J. ROSINSKI     2,982,131
AUTOMATIC ISOKINETIC SAMPLING DEVICE
Filed June 28, 1957
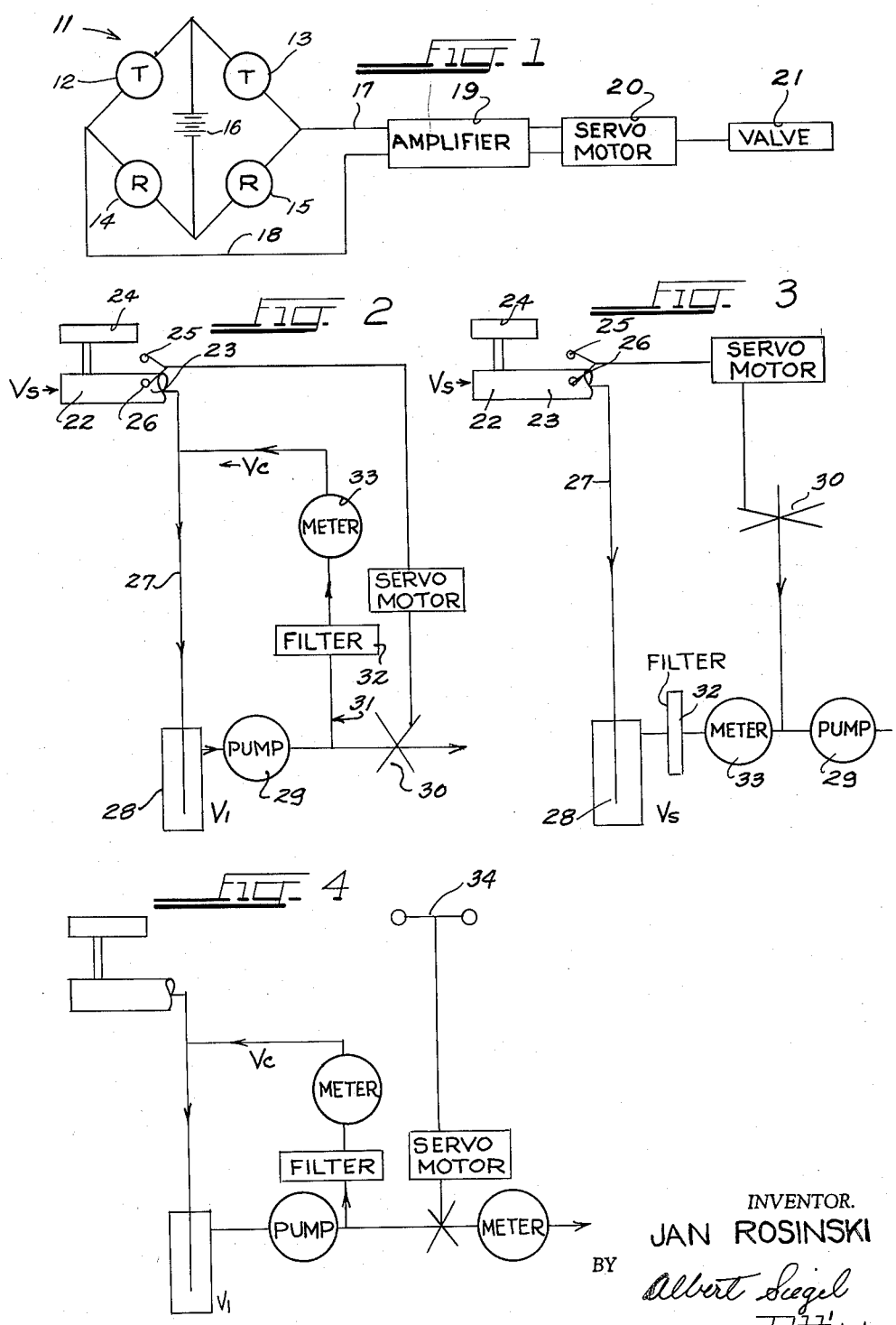
INVENTOR.
JAN ROSINSKI
BY Albert Siegel
ATT'Y.

United States Patent Office 2,982,131
Patented May 2, 1961

2,982,131
AUTOMATIC ISOKINETIC SAMPLING DEVICE
Jan Rosinski, 2346 S. Ridgeway Ave., Chicago, Ill.
Filed June 28, 1957, Ser. No. 668,817
12 Claims. (Cl. 73—170)

This invention relates to an automatic device for sampling air and other fluids isokinetically. The automatic feature of my invention consists essentially in the inclusion of a motor-operated bypass valve controlled by a Wheatstone bridge or the like. Transducers which are sensitive to changes in air velocity provide the sensing elements in such bridge. I have found that in devices produced in accordance with my invention the controlled sampling velocity follows changes in wind velocity very accurately.

Until the advent of my invention the determinations both of concentration of particles and of particle size distribution in a moving cloud of particulate matter have been extremely uncertain operations. The practice is to set up the sampling equipment for a certain fixed velocity matched to average conditions which are present in the field test area and which are expected to be present during an experiment. As is well known, in tests carried out in open terrain wind velocity may change almost continuously. As a result, the sampling equipment which is set for operation at such fixed operating parameters may introduce a multitude of errors into the final results therefrom. Errors due to anisokinetic sampling of aerosols were examined and discussed by H. H. Watson in a paper "Report of Symposium V, Aerosols," Army Chemical Center, Maryland, June 22, 23, 1953. These errors are a function not only of anisokinetic sampling, but also of such things as sampling tube diameter, the angle of the inlet tube alignment to the wind direction, and the particle size and density of the particulate matter being studied. Representative data from the above reference are shown in Table I for particles of about one density.

TABLE 1

Approximate values of $C/C_0$ [1]

As a function of $U_0/\bar{U}$, $\alpha$, and particle size

| Particle Size, $\mu$ | $\alpha$ [2] | | | $U_0/\bar{U}$ [3] | | | |
|---|---|---|---|---|---|---|---|
| | 0° | 90° | 180° | 0.6 | 1.0 | 1.5 | 2.0 |
| 4 | 1 | 0.7 | 0.42 | 0.95 | 1 | 1.02 | 1.05 |
| 12 | 1 | 0.4 | 0.20 | 0.80 | 1 | 1.08 | 1.15 |
| 37 | 1 | 0.1 | 0.02 | 0.70 | 1 | 1.36 | 1.48 |

[1] $C/C_0$=ratio of concentration measured (C) and true concentration ($C_0$).
[2] $\alpha$=angle between inlet tube and wind direction at isokinetic flow.
[3] $U_0/\bar{U}$=ratio of stream velocity ($U_0$) and mean sampling velocity ($\bar{U}$).

Ideally, sampling should be conducted isokinetically; i.e., the sample should be aspirated into the sampling system at a velocity which matches the movement of the formation to be sampled, and it is to such an ideal system and devices that the instant invention is directed.

Some methods have been developed for sampling stack gases somewhat isokinetically. However, all of these involve essentially manual adjusting of sampling velocity to a more or less constant stack velocity and have no application to continually varying field conditions.

In view of the foregoing a primary object of the instant invention is to provide means for automatic isokinetic sampling of materials borne in a fluid system.

Other objects, features, and advantages of my invention will become apparent to those skilled in this particular art from the following detailed disclosure, taken in connection with the accompanying drawings, in which;

Figure 1 is a diagram of the control system of one modification of the instant invention;

Figure 2 is a schematic diagram of one modification of the instant invention;

Figure 3 is a schematic diagram of another modification of the instant invention; and Figure 4 is a schematic diagram of still another modification of the instant invention.

I have developed a continuous isokinetic device for precise sampling of airborne particulates under rapidly changing meteorological condition as found in normal field operations. In several embodiments such device consists of the following major components:

(1) Two transducers sensitive to changes in air velocity, such as thermistors, free-spinning turbine wheels, cup anemometers, and pressure plates.

(2) A null balancing circuit for the transducers.

(3) A means of amplifying the transducer imbalance signal so that it can drive an air flow control device.

(4) A calibrated air flow control.

In other modifications, as will be more particularly shown below, an even more simple device is presented than those having such components.

Referring now to the drawings:

Figure 1 diagrammatically illustrates the control mechanism of the instant invention. A Wheatstone bridge, indicated generally by the numeral 11, is constructed with a pair of transducers, 12 and 13, a pair of precision resistance elements, 14 and 15, and a current source, 16. Most preferably the later is a D.C. source such as a battery or the like. Electrical leads, 17 and 18 connect the bridge, 11 with a high input impedance amplifier, 19, of the type, as for example, manufactured by the Brown Instrument Company, which is in turn electrically connected to a servomotor, 20. Such servomotor, 20, is operably connected to a control valve, 21, for example, a ¼-inch gate valve which is opened or closed in accordance with the actuational differences acting upon the transducer pair.

In Figure 2 one modification of a device produced in accordance with my invention is diagrammatically illustrated. The orifice portion, 22 of sampling tube, 23 is so positioned as to be capable of conforming with and facing into the wind. Such adjustment for wind direction is achieved by attaching a vane, 24 to the orifice portion, 22 and thus the latter is able to follow wind directions automatically in the $x$, $y$ and $z$ axes. For purposes of illustration, the transducer elements used in this modification are a pair of thermistors; it, of course being understood, that other types of transducers (12 and 13) of Figure 1 may also be used in my invention. The thermistors are used as air velocity detectors. One such thermistor, 25, is placed external to the sampling tube 23, whereas an internal thermistor, 26, is positioned in the lumen of such tube. The sampling tube leads the air in the direction of the arrows in pipe 27 into collector 28, of various types depending upon the physical state of the material sought to be sensed and the quantitative determination required, as for example, number of particles or the weight of a suspended gas. From the collector the matrix fluid is passed through pump 29, which functions to keep such matrix moving through the device. Such pump, 29, is of the constant volume type, and may be any convenient design. It provides such at the sampling inlet nozzle; thus there is no pressure drop at such inlet. A proportioning control valve, 30, is located external to the pump, which when open permits the escape of the matrix. If valve 30 is closed, or only partially open, the matrix, after passage through the pump, is directed through by-pass conduit, 31, through a filter, 32, which removes all material from the matarix, matrix meter 33, pipe 27, and back through the collector. The functioning of such recycling will be later considered.

The operation of such modification is fairly simple. The orifice 22 is faced into the wind by vane 24. As air velocity changes the electrical resistance of the external thermistor likewise changes, thus causing an imbalancing of the Wheatstone bridge circuit in Figure 1. Such imbalance of the bridge imparts a signal to the servomotor which in turn positions the by-pass valve 30, connected to the sampling pump 29.

As the valve opening is altered the volume of air passing through the by-pass circuit is controlled, and upon the proper positioning of such valve opening the velocities across both thermistors, or transducers become equal, at which point the inlet tube is sampling isokinetically.

In actual operation this device operates quite simply. It should be recalled that a constant volume pump 29 is preferably used. It is such volume which is the critical limitation in my system; fluid speeds up to such volume are readily handled, and such volume can be readily determined by the operator. For illustration purposes assume that the pump has an operating capacity of 1000 ml./min., and that at the beginning of the sampling procedure external air velocity equals this figure. Transducer 25 then causes the servomotor to completely open valve 30 and no bypassed air ($Vc$ in the figure) is utilized. Next assume that external air velocity drops to 400 ml./min. The transducer senses such drop and valve 30 is partially closed to permit the escape of only 400 ml./min. from the system. But, because of the constant volume pump, air through the by-pass loop, $Vc$, flows at the rate of difference between external air velocity and the pump constant, in this case 600 ml./min. Since the filter 32 removes all foreign matter from the air, the bypassed volume does not add to the materials sensed by the collector.

The external transducer 25 senses air speed changes and acts to initially position valve 30. Final positioning is accomplished when such speed acting upon both transducers has been equalized.

The arrangement in Figure 2 permits the full air flow through the sampler at all times; in this way the pressure drop across the sampler is maintained constant and the sampler operates at maximum efficiency. It should be recalled here that the by-pass line in this embodiment is part of a closed loop. For this reason, the gas meter 33 can also be placed downstream of the control valve, in which case it would directly read the air taken in by the sampling tube. The function of the by-pass is to change the volume of air bypassed across the pump until isokinetic conditions are reached. When wind velocity is decreased the valve reduces the amount of bypassed air—i.e., the valve opens. When the by-pass is not used the pump operates at full capacity sampling external air only.

In order to determine the dosage of sampled material, the total sampling volume, $Vs$, must be known. A constant volume of gas, $Vi$, is passed through the collector, and a certain volume, $Vc$, is passed through the by-pass loop. Since the volume throughput of the collector, $Vi$, per unit time, $t$, is known, as is also $Vc$, from the reading per unit time of meter 33, $Vs$ may be readily calculated:

$$Vs+Vc=Vi$$

$$Vs=Vi-Vc$$

The dosage of particulate matter, D, per volume sample is then calculated from the collector reading and the $Vs$ volume:

$$Dn=\frac{Nt}{Vs}\ \frac{\text{number of particles second}}{\text{milliliters}}$$

or $$Dg=\frac{Gt}{Vs}\ \frac{\text{gram second}}{\text{milliliter}}$$

In Figure 3 is illustrated another modification of the instant invention, the elements being essentially the same as that in Figure 2. In Figure 2, it was indicated that there is full air flow through the sampler at all times, such flow being determined by pump capacity; in such second illustration the flow through the sampler changes continuously with wind velocity, or the like, but the volume of sampled fluid is indicated directly.

In this embodiment again a pair of thermistors 25 and 26 actuate a servomotor which controls the operable positioning of valve 30, which in turn equalizes both internal and external fluid flow.

In this instance again, a constant volume pump is used. Assume again that the pump has a capacity of 1000 ml./min. and that air speed equals this figure. In this case the external transducer 25 will completely close valve 30 and all air exhausted from the system follows the route through the inlet tube 23, the collector 28, filter 32, meter 33, and pump 29. As external air speed drops (since the vane 24 compensates for the directional vector component of air velocity, we need only consider air speed) to 400 ml./min., for example, the thermistor-servomotor system operates to open valve 30 and 600 ml./min. are drawn through the valve from the atmosphere. The filter 32 is incorporated in such system primarily to protect the meter and pump from damage by foreign matter or moisture present in the air.

In this embodiment also, simple calculations are used for determining the amount of material in the air or fluid being studied. The total volume through the inlet nozzle ($Vs$) passes through the collector, but there is no by-pass throughput. The meter directly reads such volume, and material dosage is readily found by the formulas above.

It will be readily appreciated that for those embodiments described in Figures 2 and 3 that the transducer elements may include devices such as cup anemometers, pressure plates or turbine wheels.

The thermistor pair compensates for fluid temperature changes and thus it is only the speed changes which effect the servomotor mechanism. However, it should be understood that when thermistors are incorporated into the device it is perferably used to sample particulate matter rather than liquids. Liquid impingement upon the thermistor will cause such a varying temperature change therein that the servomotor will receive improper signals therefrom. Of course, the physical rather than electrical transducers do not suffer this shortcoming.

Still another modification of my invention, namely that which is illustrated in Figure 4, is excellent for the isokinetic sampling of liquid mist or fog in air. In this device a cup anemometer 34 or the like senses changes in air speed, and it alone provides the signal to the servomechanism to properly position the valve. The rate of sensor movement must be precalibrated with valve position. Flow through the system is much like that illustrated in Figure 2.

A few results using that embodiment of my invention described in Figure 2 are presented in the following table:

TABLE II

| Wind Velocity, $Ww$, meter/minute | By-pass Flow, liter/minute | Sampling Velocity, $Ws$, meter/minute | Ratio, $Ww/Ws$ |
|---|---|---|---|
| 180.0 | 10.6 | 174.0 | 1.03 |
| 110.0 | 17.7 | 111.5 | 0.96 |
| 92.0 | 18.4 | 105.0 | 0.88 |
| 70.0 | 22.5 | 69.0 | 1.01 |
| 58.0 | 23.8 | 57.6 | 1.00 |
| 33.0 | 26.4 | 34.5 | 0.96 |

Sampling velocity, $Ws$, was calculated by subtracting the by-pass flow from the total collector exhaust flow (which had been previously measured and found constant at 30.3 liters/min. over this range) and dividing by the sampling head cross section area (1.13 cm.$^2$). From these results it can be seen that such devices accurately follow the changes in the air velocity presented to them, particularly when taken in view of the results of the prior art work illustrated by Watson.

I observed that my isokinetic samplers respond to a change in wind velocity in about 2 seconds. At equilibrium, it was further observed that the balancing motor "hunts" about its equilibrium position: this can be expected because of the nature of the controlled system.

In all embodiments of my invention the type of sample collector used is determined by the type of materials to be detected. For example, impingers, impactors, absorbers, etc., could be used for this purpose.

It is, of course, understood that the various components of my invention such as collectors, meters, thermistors (and other transducer elements), pumps, and servomechanisms, are commercially available, and that such components, taken individually are not considered as part of this invention. Description has been kept purposely brief since it is felt that those skilled in this particular art, once apprised of my invention, may readily combine these various components into the operative devices shown.

It will be further understood that modifications and variations may be made without departing from the spirit and scope of my invention.

I claim as my invention:

1. A device for the automatic isokinetic sampling of fluids comprising in combination: a fluid conveying system having a tubular inlet nozzle and an outlet port, said system being closed except for such nozzle and port; means for changing the position of said inlet nozzle in accord with fluid direction external thereto, and constantly facing the opening of said nozzle into the direction of flow of such external fluid; a collector member in such fluid conveying system to collect material borne in that portion of said external fluid flow passing through said fluid conveying system; a constant volume pump operatively connected in such system; a proportioning valve within such system controlling the exhaust volume thereof; a servomechanism operatively engaged with said proportioning valve; transducer elements connected with such system to produce a signal in accordance with the difference between the external fluid flow rate and the flow rate of fluid through said inlet nozzle; means connecting said transducer elements to the servomechanism to control such servomechanism in accordance with said signal and therefore to control the proportioning valve, and metering elements within such system to measure fluid volume passage therethrough.

2. The device of claim 1 wherein said means for changing the position of said inlet nozzle comprises a fluid vane.

3. A device for the automatic isokinetic sampling of fluids comprising in combination: a fluid conveying system having a tubular inlet nozzle and an outlet port, said system being closed except for such nozzle and port; means for changing the position of said inlet nozzle in accord with fluid direction external thereto and constantly facing the opening of said nozzle in the direction of flow of such external fluid; a collector member in such fluid conveying system to collect material borne in that portion of said external fluid passing through said fluid conveying system; a constant volume pump operatively connected in such system; a tubular by-pass loop connected into said fluid conveying system; a proportioning valve within such system controlling the exhaust volume thereof; a pair of transducer elements, the first of such elements being positioned external to said inlet nozzle and the second being positioned in the lumen of such inlet nozzle, the external such element measuring environmental fluid speed and the internal such element measuring fluid speed within such nozzle; a servomechanism operatively engaged with said proportioning valve to position said valve in accordance with the signal received from said transducer element pair; a filter element positioned in said by-pass loop and metering elements within such fluid conveying system measuring fluid volume passage therethrough.

4. The device of claim 3 wherein said means for changing the position of said inlet nozzle comprises a fluid vane.

5. The device of claim 3 wherein said pair of transducer elements consist of cup anemometers.

6. The device of claim 3 wherein said transducer elements consist of pressure plates.

7. The device of claim 3 wherein said transducer elements consist of turbine wheels.

8. A device for the automatic isokinetic sampling of fluids comprising in combination: a fluid conveying system having a movable tubular inlet nozzle and an outlet member, said system being closed to its external environment except for such nozzle and member, said inlet nozzle having an air vane positioned thereon permitting said nozzle to face directly into its environmental fluid stream; a by-pass loop in such fluid conveying system; a collector member in such fluid conveying system to collect material borne in that portion of said external fluid passing through said fluid conveying system; a constant volume pump operatively connected in such system; a proportioning valve in such system controlling the exhaust volume thereof and the volume of fluid passing through said by-pass loop; a pair of thermistor elements, the first of said elements positioned external to said inlet nozzle and the second of such elements positioned in the lumen of said inlet nozzle, such external thermistor determining environmental fluid speed and said internal thermistor determining the relationship of said external speed with fluid speed through such inlet nozzle; a servomotor system connected within such air conveyor system controlling the throughput of said exhaust valve, said servomotor system acting in accordance with the signal generated from said thermistor elements; a filter element positioned in said by-pass loop whereby only sampled material-free fluid is directed back to said collector from said by-pass loop, and metering elements within such system indicating fluid volume passage therethrough.

9. A device for the automatic isokinetic sampling of fluids comprising in combination: a fluid conveying system having a tubular inlet nozzle and an outlet port, said system being closed except for such nozzle and port; means for changing the position of said inlet nozzle in accord with fluid direction external thereto, and constantly facing the opening of said nozzle in the direction of flow of such external fluid; a collector member in such fluid conveying system to collect material borne in that portion of said external fluid flow passing through said fluid conveying system; a constant volume pump operatively connected in said system; a calibratable proportioning valve within such system controlling the exhaust volume thereof; a servomechanism operatively engaged with said proportioning valve; a transducer element positioned external to the lumen of said inlet nozzle operatively connected with said servomechanism, said transducer sensing fluid speed and activating said servomechanism when such fluid speed differs from that for which said proportioning valve is calibrated, and metering elements within said system to measure fluid volume passage therethrough.

10. The device of claim 9 wherein said transducer consists of a cup anemometer.

11. A device for the automatic isokinetic sampling of fluids comprising in combination: a fluid conveying system having a tubular inlet nozzle and an outlet port, said system being closed except for such nozzle and port; means for changing the position of said inlet nozzle in accord with fluid direction external thereto, and of constantly facing the opening of said nozzle into the direction of flow of such external fluid; a collecetor member in such fluid conveying system to collect material borne in that portion of said external fluid flow passing through said fluid conveying system; a constant volume pump operatively connected in such system; a calibratable proportioning valve within such system controlling the exhaust volume thereof; a tubular by-pass loop connected into said fluid conveying system; a servomechanism operatively engaged with said proportioning valve; a transducer element positioned external to the lumen of said inlet nozzle operatively connected with said servomechanism, said transducer sensing fluid speed and activating said servomechanism when such fluid speed differs from that for which said proportioning valve is calibrated, and metering elements within said system to measure fluid volume passage therethrough.

12. The device of claim 11 wherein said transducer consists of a cup anemometer.

References Cited in the file of this patent

UNITED STATES PATENTS

| | | |
|---|---|---|
| 1,517,144 | Anderson | Nov. 25, 1924 |
| 2,699,679 | Munger | Jan. 18, 1955 |

FOREIGN PATENTS

| | | |
|---|---|---|
| 592,818 | Great Britain | Sept. 30, 1947 |